United States Patent [19]

Robertson et al.

[11] Patent Number: 5,166,323
[45] Date of Patent: Nov. 24, 1992

[54] MODIFICATION OF THE EMULSIFYING ACTIVITY OF GLUTEN BY ACID HYDROLYSIS

[75] Inventors: Jennifer A. Robertson, Roseville; John D. Tomlinson, Northbridge; Peter I. Short, St. Ives; Lisa H. O'Hare, Castle Hill, all of Australia

[73] Assignee: George Weston Foods Limited, Enfield, Australia

[21] Appl. No.: 477,935

[22] PCT Filed: Dec. 23, 1988

[86] PCT No.: PCT/AU88/00497
§ 371 Date: Aug. 16, 1990
§ 102(e) Date: Aug. 16, 1990

[87] PCT Pub. No.: WO89/06091
PCT Pub. Date: Jul. 13, 1989

[30] Foreign Application Priority Data

Dec. 29, 1987 [AU] Australia .................. PI 6117

[51] Int. Cl.⁵ .................. C07K 3/02; A23J 1/12; A23J 3/18
[52] U.S. Cl. .................. 530/374; 530/375; 530/372
[58] Field of Search .................. 530/372, 374, 375; 435/139, 140

[56] References Cited

U.S. PATENT DOCUMENTS

| | | | |
|---|---|---|---|
| 2,861,061 | 11/1958 | Borel et al. | 530/374 |
| 4,208,323 | 6/1980 | Murray et al. | 530/375 |
| 4,463,019 | 7/1984 | Okuhara et al. | 435/140 |
| 4,650,856 | 3/1987 | Yagi et al. | 530/374 |
| 4,661,356 | 4/1987 | Okuhara | 435/140 |

Primary Examiner—Robert A. Wax
Assistant Examiner—Richard C. Ekstrom
Attorney, Agent, or Firm—Weingarten, Schurgin, Gagnebin & Hayes

[57] ABSTRACT

The invention disclosed herein relates to a new and improved means of modifying gluten. The modification process consists of acid hydrolysis at relatively low temperatures for short periods of time to produce a modified gluten having improved physical characteristics of solubility, high water holding capacity, good emulsifying properties and the formation of stable foams.

10 Claims, No Drawings

MODIFICATION OF THE EMULSIFYING ACTIVITY OF GLUTEN BY ACID HYDROLYSIS

The present invention relates to a process for modifying gluten and to the resultant product with improved characteristics.

BACKGROUND

Gluten is a complex mixture of proteins from wheat. Traditionally, it has held a unique place as a protein additive in yeast-raised baked goods due to its ability to form extensible tough films and maintain this structure during the baking process. It has also been used in other food processing areas such as in the manufacture of pasta, breakfast cereals, vegetarian diet foods, portion control foods such as pies and in the manufacture of smallgoods.

Wheat gluten holds approximately twice its own weight in water when fully hydrated under conditions where considerable energy is imparted as, for example, in high speed mixing. However, when dry gluten is hydrated with minimal work, it adheres strongly to itself to form a ball with approximately its own weight of water. Gluten exhibits poor emulsifying activity, i.e. it does not promote the formation of stable emulsions nor does it produce stable foams. It is largely insoluble in water at neutral pH but shows good solubility at acidic pH.

The uses of gluten (wet or dry) have been restricted therefore in those applications which require good emulsifying properties, high water holding capacity, the formation of stable foams or high solubility.

Various methods have been investigated and proposed to alter the functional characteristics of wheat gluten. Desired properties resulting from such modifications include improved solubility, improved ability to emulsify fats, improved ability to whip and other properties apparent to those skilled in the art.

Thus one known process involves treatment of wheat gluten with alkaline chemicals at varying temperatures and times. Such methods claim to remove primary amides from glutamine and asparagine residues and thus increase the solubility of wheat gluten. These processes may or may not include a neutralisation step after reaction. However, while the process is simple to execute, it involves the use of highly corrosive chemicals and in some cases evolution of toxic and corrosive gases such as $H_2S$ and $NH_3$. The products frequently contain short chain peptides which by their chemical nature and sequences are known to impart bitter flavours to the modified gluten Other detrimental changes include unpleasant odours and colours in the final products. [Batey and Gras (1981) J Fd-Technol 16 561–566]

Another known process includes the use of acids to effect deamidation of the side chains of the gluten. These processes may or may not involve a neutralisation step prior to drying. Such processes are claimed to result in improved solubiltity whipping properties and emulsification, but frequently involve hydrolysis and denaturation of the gluten proteins during or prior to the modification. Denaturation results in disruption to the primary, secondary, tertiary and quaternary structures of the proteins. Such processes may result in products which like those from alkaline modifications have bitter flavours, and unpleasant odours. Similarly, while such processes have utilised pH and pI properties of the wheat proteins to effect modifications, they are frequently unecomonic to perform commercially. [Wu et al (1976) J. Agric Food Chem 24: 504; Finley, J. W. 1975 J. Fd Sci 40 1283; Yagi et al (1985) European Patent 0 164 929

Another group of known processes includes the use of enzymes notably proteases in alkaline, neutral or acid conditions. Proteases used have included those from vegetable, animal or microbial sources. Enzymically modified glutens may result from controlled hydrolysis reactions in which the enzyme may be finally inactivated prior to drying or from non regulated hydrolysis reactions where enzyme inactivation does not occur and residual enzyme remains in the final product. Enzyme inactivation is generally achieved by pH or temperature adjustment. Increased solubility occurs in most enzymically modified glutens, but there is often a major reduction in molecular size of the hydrolysed protein. Prior art indicates that in some enzyme modifications denaturation of the gluten proteins occurs as part of the reaction and the products frequently contain bitter flavours. [Batey J (1985) Appl. Biochem 7 423–429; Verma & McCalla (1966) Cereal Chem 43 28; Novo Industri Process Development Bulletin #6 February 1988 ]

Finally other known processes for the modification of gluten include the preparation of salts of gluten including succinates, phosphates, sulfates.

Gluten salts are generally produced under extremes of pH and temperature both of which would be expected to produce changes in gluten structure. [Knight J. W. 1965 The Chemistry Of Wheat Starch and Gluten p92–94 ]

Succinylation has been achieved using succinic acid in 1, 4 dioxane at low temperatures. [D. R. Grant 1973 Cereal Chem 50 417 ]

All known gluten modifications have resulted in alterations of the structure of the gluten which may affect the primary and secondary structure of the protein as well as the tertiary and quaternary. Denaturation of the protein occurs prior to hydrolysis or modification occurring.

Although some improvements in functional characteristics have been noted, the production methods have often been uneconomic, the products frequently possess "off-flavours" and odours which would be unacceptable. Combinations of modified glutens with proteins from other animal and vegetable sources have been proposed. (Batey IL & Gras PW, (1983) Food then 12, 265; Yagi, N et al (1985) European Patent 0 164 929).

It has been surprisingly discovered by us that when gluten is subjected to much less severe conditions for relatively short periods of time at slightly elevated temperatures, but below the known temperature of denaturation, the resulting product exhibits marked improvements in functional properties such as water holding capacity, emulsification and foaming properties.

Little attention has been paid to the effect of mild conditions on changes to the functionality of gluten, nor to the residual gluten after modification to increase solubility. It has been surprisingly discovered, that when gluten is subjected to acid conditions for short periods of time at slightly increased temperatures, the functional properties of the resulting product are markedly improved in terms of water holding capacity, emulsification and foaming.

DEFINITIONS

Foam Expansion (FE) is defined as the percentage increase in volume of a liquid following whipping.

Foam Liquid Stability (FLS) is defined as the percentage of the original volume of liquid (prior to whipping) remaining in the foam after standing for a set time.

Foam Volume Stability (FVS) is defined as the volume of foam remaining after standing for a fixed time, expressed as a percentage of original foam volume.
Where:
FE = foam expansion obtained by whipping 5 g of the gluten with 100 ml of water in a Kenwood mixer with whisk for 5 minutes at a maximum speed. The whipped sample is transferred to a graduated container and measurements of total volume and residual liquid made. Foam volume was obtained by difference. These readings were repeated after 30 minutes. Foam expansion expressed as a percentage is calculated as $$FE = \frac{\text{Total Volume} - 100 \times 100}{100(\%)}$$

FVS = foam volume stabiltiy is calculated from $$\frac{\text{Foam Volume after 30 minutes} \times 100(\%)}{\text{Initial Foam Volume}}$$

FLS = foam liquid stability is determined from $$\frac{\text{Volume of liquid retained in foam after 30 minutes} \times 100\%}{100}$$

Emulsifying Activity (EA) is defined as the percentage of oil which can be formed into an oil in water emulsion by a known weight of protein.
Where:
EA = emulsifying activity obtained by combining 7 g of gluten d.s.b. with 100 ml of water and 100 ml of soy bean oil and homogenising in a Sorvall Omnimixer for 1 minute (10,000 rpm). The sample was divided into 2 portions, with one reserved for Emulsification Stability (ES), and the remaining portion centrifuged at 1500 g for 15 minutes. EA is measure as $$\frac{\text{Height of emulsified layer}}{\text{Height of Total Tube Contents}}$$

and then expressed as a percentage.

Emulsfying Stability (ES) is defined as the percentage of oil in water emulsion remaining after a specified time at 80° C. and a stated gravitational force.
Where:
ES = emulsifying stability obtained by heating the unused portion from EA above at 80° C. for 30 minutes, cooling to ambient temperature and storing at 4° C. overnight. The emulsion is then centrifuged at 1500 g for 15 minutes. The Emulsion Stability expressed as a percentage is $$\frac{\text{Height of remaining emulsified layer} \times 100}{\text{Height of Whole Layer}}$$

Water Holding Capacity (WHC) is defined as the percentage water which is bound per gram of proteinaceous material.

Water Holding Capacity (WHC) is determined by weighing out 5 g of dry gluten (as is basis) to which is added 45 ml of distilled water, this is mixed and vortexed for 10 minutes then allowed to stand of 10 minutes before centrifugation (10 minutes at 5000 g). After removal of the supernatent the mass of the hydrated gluten is calculated.

SUMMARY OF THE INVENTION

In one aspect, the present invention provides a process for the modification of gluten consisting of treatment of wet or dry gluten with or without the input of energy in acidic conditions (at or below pH 6) at a temperature and for a time sufficient to produce a gluten having an emulsifying activity as herein defined of greater than 10, and conditions of time, temperature and pH being sufficiently mild to avoid substantial denaturation.

Preferably, the emulsifying stability of the modified gluten is greater than 10.

The process of the invention is preferably carried out at a temperature greater than 10° C., more preferably between about 10° and 50° C., for a period of time exceeding 1 minute, most preferably between 10 minutes and 2 hours although this time may be extended.

The liquid phase may contain any mineral acid (e.g. $H_3PO_4$, HCl, $HNO_3$, $H_2SO_4$ etc.) or any organic acid (e.g. citric acid, lactic acid, acetic acid, tartaric acid etc.) or any salt or combination of salts of such acids. The preferred modification of gluten is carried out at or below pH 5 and at or below 50° C. for a period exceeding 10 minutes.

It has been surprisingly found that effluent liquors from a starch processing operation which naturally contain lactic acid are particularly suitable. Lactic acid is produced in the starch liquors by naturally occurring micro-organisms such as Lactobacillus sp and Acetobacter sp. It will be appreciated and acknowledged by those skilled in the art that these effluent liquors are not unique to the starch processing industry and that effluent streams from other food processing plants may be employed (e.g. breweries, dairies etc).

It will be evident to those familiar with the industry that starch processing liquors containing high Lactobacillus populations will also contain mixtures of enzymes secreted by the microorganisms as part of their normal metabolism.

In another aspect of the present invention there is provided a process for the modification of gluten consisting of treatment of wet or dry gluten with or without the input of energy in acidic conditions. The effluent starch liquors may or may not be heat treated to pasteurise and inactivate enzymes.

In another aspect the invention provides a modified gluten produced by the process specified above.

The gluten produced in accordance with the present invention may be of lower elasticity than that produced by previously know methods. Problems arising from this may be ameliorated by the additions of anions such as chlorides, sulfates, phosphates, citrates, lactates etc.

The modification can be carried out in a suitable chamber, wherein the contact time, temperature and energy input are strictly controlled. This may be done batchwise with various process equipment. It has also been demonstrated that the material can be effectively continuously processed using a submerged scroll device, examples being a classical gluten extractor or a counter current extractor or any device which will externally heat and move up an incline in a given direction with varying but specified times in a forward and reverse mode. Alternately, the use of intermixing devices, for example, gear or mono pump in conjunction with for example a shell and tube heat exchanger may be used. Other processes will be obvious to those skilled in the art.

It is evident that with modern process conditions that the whole system can be infinitely varied and computerised.

The modified gluten produced in accordance with the invention may be subjected to one or all of the following unit operations in any order, washing, dewatering and dehydration and grinding. Dewatering may be achieved by any known means including decantation or centrifugation.

In one embodiment the present invention relates to a process for producing a highly concentrated dry modified gluten product. It will be understood by those skilled in the art that several dehydration techniques may be applied to obtain the dried product including lyophilisation, roller drying, spray drying, drying on carriers. The preferred method uses conventional gluten driers with an inlet temperature not exceeding 120° C. and an outlet temperature not exceeding 55° C., but these are not self limiting.

In another aspect the invention provides a series of products with improved functionality including increased water holding capacity, increased emulsification activity, the ability to form stable emulsions, increased dispersibility and the ability to form stable foams.

The following specific examples illustrate some aspects of the present invention. They are set forth by way of illustration and teaching only and are not to be construed as limiting on the scope of the present invention.

BEST MODES OF CARRYING OUT THE INVENTION

EXAMPLE 1

The following procedure represents a preferred process for obtaining a modified gluten utilising a batch-wise process.

Effluent liquors from a starch processing operation, which liquor contained lactic acid and was at pH between 3 and 3.5 was treated with steam to bring the temperature to greater than 90° C. and kept at that temperature for 10 minutes to reduce microorganism load.

The liquor was cooled to 45° C. and wet gluten (at ambient temperature) was added in the ratio of 1 part wet gluten to 1 part liquor. The resultant temperature was between 35° C. and 37° C. The mixture was occasionally stirred for one hour at this temperature, after which the treated gluten was washed in cold water, frozen and lyophilized.

After freeze drying the product obtained was in the form of platelets which had a high surface area and were easily ground. The platelets were micalike in appearance.

EXAMPLE 2

The following represents a preferred process for obtaining a modified gluten using a continuous process. Effluent liquors from a starch processing operation were prepared as in Example 1 with the exception that the liquor was adjusted to 50 mM with respect to phosphate or lactate, pH was as for Example 1. Gluten was continuously fed into countercurrent extractor into which pasteurised effluent liquors were continuously sprayed and maintained at a temperature between 30° C. and 40° C. Residence time was adjusted to between 30 and 60 minutes. The gluten was washed with cold water and dried using a normal gluten drier inlet temperature 110–120° C. exit temperature 45°–50° C.

EXAMPLE 3

The following procedure represents a preferred process for obtaining a modified gluten using a high efficiency intermixing device. The preferred device for this example was the use of a high speed homogeniser in which gluten was modified by the addition of mineral acid to produce a final pH of 2.7. Modification was achieved after homogenisation for 1 minute.

EXAMPLE 4

The following study was undertaken to assess the effect of reaction time on functional characteristics of the modified gluten produced in Example 1.

Several products were produced from a process described in Example 1 wherein samples were removed at intervals throughout a period of 60 minutes, -product once removed was washed with cold water, and lyophilised.

TABLE 1

| Effects of modification on 6 parameters of gluten functionality. | | | | | | |
|---|---|---|---|---|---|---|
| Sample No. | Reaction Time | EA | ES | FE | FLS | FVS | WHC |
| 1 | 0 (Control)[1] | 1 | 1 | 900 | 49 | 86 | 130 |
| 2 | 20' | 57 | 73 | 900 | 44 | 100 | 125 |
| 3 | 40' | 62 | 68 | 1100 | 20 | 100 | 330 |
| 4 | 60' | 100 | 100 | 1300 | 19 | 100 | 406 |

Note [1]Lyophilised wet gluten.

The product of this invention thus provides a gluten with enhanced emulsification activity and stability, increased water holding capacity and improved foaming properties.

EXAMPLE 5

It is widely known and accepted in the industry that denaturation of gluten can occur by a variety of ways. In a physical or mechanical sense any activity generating heat energy automatically precedes denaturation.

The following example describes the effect of reaction temperature on some functional characteristics of modified gluten.

The preferred pH was 3.5 during this modification and the preferred time of reaction was 60 minutes. The gluten was washed and subsequently lyophilised.

TABLE 2

| Effect of Reaction Temperature on Gluten Functionality. | | | |
|---|---|---|---|
| Reaction Temperature | WHC | EA | ES |
| 23° C. | 152 | 100 | 100 |
| 37° C. | 406 | 100 | 100 |
| 45° C. | 304 | 89 | 92 |
| 50° C. | 276 | 80 | 81 |
| 55° C. | 321 | 7 | 10 |

The intention of this application is to illustrate that this factor requires control, but obviously all parameters have not been considered here. To those familiar with proteins it is obvious and well known that water holding capacity increases with increase temperature, however, the ability of these glutens to emulsify fat is achieved by mild temperature conditions.

EXAMPLE 6

It is widely known in the industry that gluten can be dried by a variety of processes; the drying methods employed may affect the performance of the finished product.

The following example describes the effect of different drying methods on the functional characteristics of the modified gluten.

Gluten was modified as described in example 1 with the exception that the time of modification was extended to two hours prior to drying of the gluten.

Drying procedures e.g. roll drying or spray drying where temperatures are likely to exceed the denaturation temperature of the protein are seen to result in a concomitant reduction in both the emulsifying activity and stability.

TABLE

| Effect of Drying Methods on Gluten Functionality | | |
|---|---|---|
| | EA | ES |
| Freeze Dried Modified Gluten | 100 | 100 |
| Spray Dried Modified Gluten[1] | 95 | 88 |
| Roll Dried Modified Gluten | 67 | 65 |

[1]Spray drying conditions include a preheat to 50° C., inlet air temperature was maintained where possible between 220–225° C. and outlet temperature to between 90–100° C.

EXAMPLE 7

Gluten was modified using the mineral acid HCL which was added to the wet gluten as per Example 1. The pH was continually adjusted to the required pH throughout the reaction. The reaction time was limited to 60 minutes, and the reaction was controlled and maintained at 37° C. for the duration of the reaction.

TABLE 3

| Effect of pH on resultant gluten functionality. | | | |
|---|---|---|---|
| pH of Reaction | WHC | EA | ES |
| 3.0 | 354 | 100 | 100 |
| 4.0 | 206 | 100 | 100 |
| 5.0 | 176 | 70 | 80 |
| 6.0 | 121 | 58 | 75 |
| distilled H$_2$O (pH 6.98) | 158 | 8 | 12 |

As described in the preferred embodiments of the process, it is obvious that factors such as pH require control to produce modification and mild hydrolysis of the gluten.

EXAMPLE 8

This example is designed to illustrate the interaction between reaction parameters. It is in no ways limiting and serves only by way of illustration.

Citrate buffers [0.1M] were prepared to the required pH and gluten was modified as described in Example 7. The pH of liquor during the modification was monitored and when necessary readjusted.

TABLE 4

| Effect of pH and Reaction time on the Resultant Gluten Functionality. | | | |
|---|---|---|---|
| | Reaction Time-minutes | | |
| | 30 | 60 | 90 |
| pH of liquor 3 | 311 | 327 | 415 |
| 4 | 290 | 325 | 422 |
| 5 | 167 | 272 | 367 |
| 6 | 166 | 242 | 327 |
| distilled H$_2$O | 130 | 135 | 143 |

*Table results refer to water holding capacity.

The effects and interactions between these parameters will be obvious to those who are familiar with the properties of proteins and the factors affecting their functionality.

The following examples are by way of illustration as to the applications of the product of this invention in food products. They must not be construed as self limiting and further applications will be apparent to persons familiar with the use of proteins as functional ingredients in a wide variety of foodstuffs.

EXAMPLE 9

The following example is by further way of illustration of the effects and interactions between parameters such as reaction time, reaction pH, and acid type where handling characteristics and also yield of the product are improved by addition of an anion e.g. phosphate, sulfate and other anions known to those familiar with gluten processing.

Gluten was modified as described in example 1. Sub-samples of the resultant modified product and the effect of post modification anion addition, namely phosphate, were evaluated.

TABLE 5

| REACTION TIME | 1 HOUR | | | 5 HOURS | | | 20 HOURS | | |
|---|---|---|---|---|---|---|---|---|---|
| Parameter | EA | ES | WHC | EA | ES | WHC | ES | ES | WHC |
| Example Produced example 1 | 100 | 100 | 402 | 100 | 100 | >500* | 100 | 100 | >500* |
| Example produced example 1 + anion | 100 | 100 | 230 | 100 | 100 | 245 | 100 | 100 | 212 |

*product soluble

The post modification phosphate anion addition resulted in improved handling quality and improved yield of the final dried product.

EXAMPLE 10

A product from Example 2 was incorporated into a frankfurt formulation.

Functional protein sources such as soy isolates are used in the commercial manufacture of smallgoods in order to increase yield and to enhance the binding and textural properties of the meat emulsion system and to reduce costs.

The modified gluten was trialled and compared with the functional performance of a soy isolate in a typical frankfurter formulation, the protein replacement modified gluten for soy isolate was done on an equal protein replacement basis.

TABLE 6

Typical frankfurter formulation

| Formulation | Product A | Product B |
|---|---|---|
| Mutton 75 cl | 42.00 | 42.00 |
| Mutton 50 cl | 13.50 | 13.50 |
| Beef 70 cl | 18.00 | 18.00 |
| Beef Fat | 15.00 | 15.00 |
| Ice/Water | 44.00 | 44.00 |
| Binders/Premix | 15.00 | 15.00 |
| Modified gluten | — | 3.00 |
| Soy isolate | 2.67 | — |

Two 150 kg blocks were manufactured using formulations described in Table 6, the cook losses were monitored and the finished products subjected to laboratory evaluation.

TABLE 7

| Results: | Product A | Product B |
|---|---|---|
| % PROTEIN | 11.8 | 11.4 |
| % FAT | 18.0 | 17.1 |
| % MOISTURE | 62.7 | 64.1 |
| % CHO by diff. | 4.1 | 4.6 |

The cook losses from the frankfurters containing the soy isolate were of the order of 10%. Cook losses from the modified gluten frankfurters were less than 1%. The finished products had no evidence of fat capping and were quite acceptable as a commercial product.

EXAMPLE 11

The aim of this trial was to utilise the product from Example 2 in a commercial frankfurt. The formulation used in the factory uses a high level of soy isolate and a low level of muscle meat. It also contains high levels of mechanically deboned meat and rechop. A total premix containing salt, binders, phosphate, seasoning, cure etc is also added instead of individual ingredients.

The standard recipe contained 15 kg of soy isolate per 460 kg block. Two blocks were manufactured
(A) using 15 kg of soy isolate and
(B) using 16.85 kg of modified gluten.

The traditional method was used for Batch A i.e. the soy isolate was hydrated in the cutter with approximately 75 L of Ice/Water. The lean meats, fat, water/ice and pre-mix were then added. This was then pumped through an emulsifier. Batch B was made by placing the lean meats into the cutter with the Modified Gluten and approximately 60 L of cold water, this was then chopped until tacky. The remaining fats and rechop were then added before the remaining cold water/ice and pre-mix. These mixes were also emulsified.

The emulsions were filled out into cocktail frankfurts. As the filler used for cocktail frankfurts requires a mixture of high viscosity, the general practice is to lower the added water by 20 Litres (approx. 4.5%). This was done in both cases.

The modified gluten compared favourably, especially in the area of raw emulsion viscosity.

Results demonstrated that the modified gluten performed in this formulation as effectively as the soy isolate.

EXAMPLE 12

Product from Example 2 namely the continuous process has been used in the production of speciality smallgoods i.e. Pizza Topping Meats.

Pizza Topping Meats are required to process sufficient "body" or firmness in order to be processed through automated dicing machines.

Therefore, the raw meat emulsion must have a viscosity greater than that of a frankfurter emulsion, the functional protein employed (either soy isolate or modified gluten) is fully stressed during processing.

The modified gluten was used as a straight replacement for the soy isolate, in 50 kg blocks of Pizza Topping Meat.

Results indicate that there were not significant yield cook losses, no fat capping was evident and the dicing machine was able to handle the product effectively.

EXAMPLE 13

Modified gluten similar to that described in Example 2 has been used as a partial egg replacer in baked goods. A typical choux pastry formulation was used:

| Formulation | Product A | Product B |
|---|---|---|
| Medium Flour | 230.00 | 230.00 |
| Margarine | 170.00 | 170.00 |
| Whole Egg | 320.00 | 160.00 |
| Modified Gluten | NIL | 40.00 |
| Water | 290.0 | 410.00 |
| | 1010.00 | 1010.00 |

*The formulation was adjusted based upon the solids of whole egg being 25%.

The final baked products were evaluated and were of an acceptable standard to those familiar with such goods.

EXAMPLE 14

Modified gluten has been used as an emulsifying agent of fats and oils in various food systems. A product similar to that produced in Example 2 has been used as an egg replacer in a typical mayonnaise preparation.

| Formulation | Product A | Product B |
|---|---|---|
| Water | 82.00 | 82.00 |
| Starch | 15.00 | 15.00 |
| Mustard | 8.00 | 8.00 |
| Sugar | 40.00 | 40.00 |
| Salt | 7.00 | 7.00 |
| Vinegar 4% | 140.00 | 140.00 |
| Egg Yolk | 8.00 | 4.00 |
| Modified Gluten | NIL | 4.00 |
| Oil | 100.00 | 100.00 |
| | 400.00 | 400.00 |

The resulting mayonnaise products were of satisfactory quality, having good stability, neither product broke during centrifugation, shaking, or storage. Both preparations are of a commercial quality.

The applications of this product include those traditionally met by vital wheat gluten and can be extended to include other food formulations where emulsification and water holding capacity are desired.

Examples include but are not limited to the manufacture of smallgoods, meat substitutes and vegetarian preparations, confectionery, convenience health and portion control foods and pet foods.

Although only preferred embodiments of the present invention have been hereinbefore described, it should be understood by those skilled in the art that many other forms of the invention are possible within the scope of the present disclosure.

We claim:

1. A process for modifying gluten to produce a modified gluten having an emulsifying activity, as herein defined, of greater than 10, comprising the steps of:
providing gluten to be modified;
adding said gluten to a liquor having a pH below pH 5 to acidify said gluten;
heating said gluten and said liquor to a temperature in the range of about 10° C.–49° C. for a time period of at least one minute, while maintaining the pH below 5, said time, temperature and pH being selected in combination so as to modify the gluten to achieve said emulsifying activity with the proviso that if the pH is between 3 and 4 and the temperature is above 40° C. then the time exceeds 30 mins.;
separating solid modified gluten from the liquor; and
retaining said modified gluten.

2. The process of claim 1, wherein said heating step is carried out for a time period in the range of about 10 minutes to 2 hours.

3. The process according to claim 1, wherein said pH is maintained below pH 5 by the addition of $H_3PO_4$, HCl, $HNO_3$, $H_2SO_4$, citric acid, lactic acid, acetic acid, tartaric acid, or mixtures thereof.

4. The process of claim 1 wherein said liquor comprises Lactobacillus sp or Acetobacter sp.

5. The process of claim 1 wherein said liquor comprises lactic acid.

6. The process of claim 1, further comprising the step of pasteurizing and cooling said liquor prior to adding said gluten.

7. The process of claim 1 further comprising the step of adding anions such as chlorides, sulphates, phosphates, lactates or mixtures thereof prior to said heating step.

8. The process of claim 1 wherein the pH of said gluten and said liquor is maintained at about pH 3.0–3.5.

9. The process of claim 1 wherein said heating step is carried out at a temperature of about 35° C. to 37° C. for about 1 hour.

10. The process of claim 1 further comprising the step of freezing and lyophilizing the resultant modified gluten.

* * * * *